United States Patent [19]

Von Bargen et al.

[11] 4,048,668

[45] Sept. 13, 1977

[54] ELECTRICALLY DRIVEN HIGH VOLTAGE OZONATOR

[75] Inventors: John D. Von Bargen, Cypress; Khalid U. Siddiqui, Westminister, both of Calif.

[73] Assignee: Source Gas Analyzers, Inc., Garden Grove, Calif.

[21] Appl. No.: 576,040

[22] Filed: May 9, 1975

[51] Int. Cl.$^2$ .................................. C01B 13/11
[52] U.S. Cl. .......................... 361/235; 250/535; 250/539
[58] Field of Search .............. 250/532, 535, 536, 539, 250/540, 541; 321/4; 317/3, 4, 151, 262 AE, 262 S, 96; 361/225, 231, 235, 56

[56] References Cited

U.S. PATENT DOCUMENTS

| | | | |
|---|---|---|---|
| 982,587 | 1/1911 | Gerard | 250/536 |
| 1,519,373 | 12/1924 | Hart | 250/539 |
| 2,089,793 | 8/1937 | Hartman | 250/539 |
| 3,461,310 | 8/1969 | Pintell | 321/4 X |
| 3,496,092 | 2/1970 | Fraser | 321/4 X |
| 3,784,838 | 1/1974 | Lowther | 250/536 |
| 3,843,882 | 10/1974 | Presnetsov et al. | 250/536 |
| 3,844,741 | 10/1974 | Dimitrik | 250/532 X |
| 3,875,035 | 4/1975 | Lowther | 204/176 |
| 3,884,819 | 5/1975 | Schultz et al. | 250/533 |
| 3,899,685 | 8/1975 | Francis et al. | 250/536 |

FOREIGN PATENT DOCUMENTS

| | | | |
|---|---|---|---|
| 636,323 | 4/1928 | France | 250/536 |
| 1,233,892 | 6/1971 | United Kingdom | 317/262 S |

OTHER PUBLICATIONS

IBM Technical Disclosure Bulletin vol. 1, No. 1, June 6, 1958.

*Primary Examiner*—Harry E. Moose, Jr.
*Attorney, Agent, or Firm*—Frederick E. Mueller

[57] ABSTRACT

A method and apparatus for generating high concentrations of ozone using a solid state high voltage power supply and a specially designed ozonator. The power supply comprises a rectifier and voltage doubler to which commercial AC line current is applied to produce a 300 volt DC output which, in turn, is applied across a solid state switching device to chop the DC output at an adjustable high frequency rate. The switch means is controlled by a timing and trigger circuit and the output of the switch means is applied to the input of an auto-transformer of the automotive ignition coil type which raises the high frequency output of the switch to a very high voltage level in the range of 30,000 to 50,000 volts peak to peak. This is applied to the high voltage electrode of each cell of a concentric electrode type ozone generator. The heat limiting problems encountered in the prior art are ameliorated both by elimination of iron core transformers or choke coils and by utilizing a counter-flow gas feed principle in the ozonator to cool the inner high voltage electrode by the incoming air or oxygen flow before it is passed through the corona discharge gap. This counter flow is achieved by passing the feed gas through the inside of the hollow inner electrode before entering the gap. The AC field of the inner core thus also deionizes the gas before it is passed through the corona discharge thereby achieving further energy savings. Power consumption in the power supply may be further reduced by using a single limiting impedance to drive a plurality of similar output channels, each of which is connected to its corresponding ozonator generator in a manner such as to achieve maximum power transfer. The combined effect of these features is to minimize electrical power consumption per pound of production of ozone.

10 Claims, 4 Drawing Figures

ELECTRICALLY DRIVEN HIGH VOLTAGE OZONATOR

BACKGROUND OF THE INVENTION

I. Field of the Invention

This invention relates to corona generators and more particularly to an electrically driven ozone generator having a solid state power supply for providing a high voltage, high frequency potential to the corona gap of each cell in a plural cell ozonator. Such ozone generators have many commerical and scientific uses, one of which, for example, is the supply of ozone to an air pollutant measuring instrument of the chemiluminescent monitoring type such as is disclosed in the copending application of John D. Von Bargen and Khalid U. Siddiqui filed on Apr. 21, 1975, entitled "Monitor for Detection of Chemiluminescent Reactions" and assigned to the same assignee as is the present application.

II. Description of the Prior Art

The basic physical principles of obtaining ozone by passing pure oxygen or other gasses containing oxygen through a corona discharge maintained across the gap between two electrodes have been known for many years. The basic prior art is, for example, illustrated in U.S. Pat. No. 3,455,803 issued to F. A. Miller on July 15, 1969 and by the prior art cited therein. Over the years, efforts have been made to refine these generators and the power supplies forming an integral part of their operating circuitry. These efforts have been particularly directed at increasing efficiency and reducing both the cost of operation and the cost of manufacture as well as increasing the output of ozone per unit of power consumed. Many factors have contributed to setting the prior art limits on efficiency. These factors and the efforts made to increase efficiency in the light thereof are discussed, for example, in U.S. Pat. No. 3,496,092 issued on Feb. 17, 1970 to J. C. Frazer; in U.S. Pat. No. 3,784,838 issued on Jan. 8, 1974 to Frank E. Lowther; and in U.S. Pat. No. 3,800,210 issued on Mar. 26, 1974 to George Caussin. The commercially available ozone generators, however, remain relatively bulky and inefficient relying either on iron core step up transformers or choke coils in the circuitry for supplying the high voltage potential to the ozonator electrodes.

It is an object of the present invention to provide an ozone generator of improved efficiency over the prior art to thereby minimize the electrical power consumed per pound of ozone produced.

It is a more particular object of the invention to provide such apparatus which eliminates the need for iron core transformers or choke coils by utilizing a capacitatively coupled auto-transformer of the automotive ignition coil type to supply a very high voltage, high frequency potential to the ozonator electrodes which form a parallel tuned circuit with its output.

It is another specific object of the invention to provide an ozone generator comprising a plurality of such ozonator cell groups, each of which has its individual high voltage supply all of which are connected in parallel across the output of a single power rectifier state and are fed through a single current limiting impedance in series with all of the parallel connected outputs to thereby minimize the power loss in the voltage drop across the limiting impedance.

SUMMARY OF THE INVENTION

The present invention comprises a plural cell ozone generator, each cell of which is fed in parallel flow from a single gas inlet manifold which supply an oxygen containing gas through an inner high voltage tubular electrode and then into the discharge gap. The gas is flowed the full length of the inner tube before being admitted through apertures to the corona discharge gap formed between this high voltage electrode and an outer concentric dielectric cylinder contacting an outer ground electrode. This flow of the inlet gas is thus used to cool the inner electrode when a high voltage, high frequency potential is established across the gap between it and the outer electrode to maintain a corona discharge. The gas is then flowed back through the corona discharge gap and returned into the outlet channel of the member manifold for discharge to any utilization device. The high voltage, high frequency potential across the electrode is supplied from an integrally designed solid state power supply which comprises a voltage rectifier and doubler circuit intended to be connected to commercially available AC power sources. The output of the rectifier is connected through a limiting impedance to the input of one or more solid state switching circuits, there being one such circuit associated with each group of ozonator cells. Each of the solid state switching circuits is controlled by an RC timing circuit and a trigger component and has its output capacitatively coupled to the input of an autotransformer of the automotive ignition coil type, the output of which is applied across the electrodes of its parallel connected ozonator cells. The circuit minimizes power losses in the power supply by utilizing a single limiting impedance to absorb the voltage drop for each of the power supply ouput channels and by eliminating the use of choke coils or iron core transformers. The efficiency of the ozonator cell is improved by providing the deionizing simultaneously achieved by the cooling flow of inlet gas to carry away heat from the inner high voltage electrode and thereby ameliorate the heat limiting effect recognized in the prior art and by dimensioning it to have a capacitance which parallel tunes the transformer output to a resonance peak frequency equal to the switching frequency.

BRIEF DESCRIPTION OF THE DRAWINGS

These and other objects, features and advantages of the invention will be more fully apparent from the following detailed description of a preferred embodiment of the invention taken in conjunction with the accompanying drawings wherein like reference characters refer to like parts throughout and in which.

DETAILED DESCRIPTION OF THE INVENTION

Figure 1:
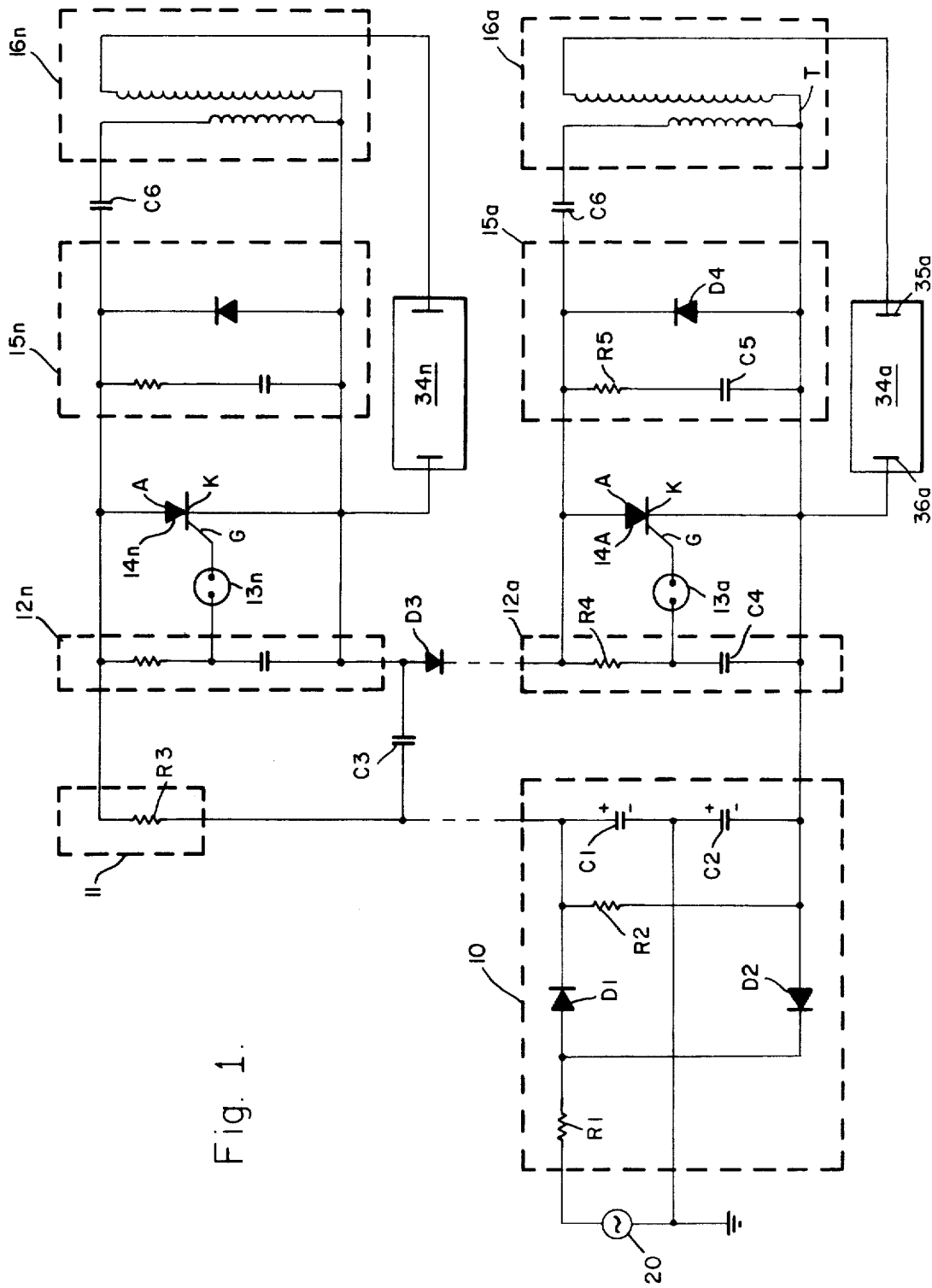
FIG. 1 is a circuit and block diagram of the solid state power supply electrically driven ozonator of the present invention.

Turning now to the drawings, there is shown in FIG. 1 a combined block and circuit diagram of the power supply circuit for the plural ozonator cell corona generator. In FIG. 1 it will be seen that power from the line AC voltage source 20 normally at a commercial level of approximately 110 volts r.m.s. is applied to a rectifier and voltage doubler circuit 10 which has approximately 300 volts peak-to-peak at its output terminals across capacitors C1 and C2. The output of the rectifier circuit 10 is applied through a limiting impedance element 11 to the input states 12a through 12n of a plurality of ozonator generator drive network channels which are connected in parallel across the rectifier circuit and limiting resistor which are in series with each other and with each of the ozonator cell driving networks. Limiting impedance 11 may be a pure resistance, but in practice it preferably consists of two series connected 100 watt light bulbs.

Each of the driving networks is identical. Although only two channels are shown in FIG. 1, it will of course be understood that any reasonable number may be used, there being one channel for each plural cell generator such as 34 shown in FIGS. 2, 3, and 4. If the twelve cell generator shown by way of example were used alone, it will of course be understood that impedance 11 would be connected directly between the output of rectifier 10 and the input state 12a. Each driving network comprises a timing circuit such as 12a or 12n, a trigger component such as 13a or 13n, a solid state switching element such as 14a or 14n, a snubber and clipper network such as 15a or 15n, and an auto-transformer of the ignition coil type such as 16a or 16n, which is capcitatively coupled to the switching circuit as by capacitor 66. Each auto-transformer has one side of its output connected to the bus 35a parallel connecting high voltage electrode such as 17a or 17n of the associated ozonator cells and the other side connected to the bus 36a parallel connecting the ground electrodes such as 18a or 18n. Bus 36a is in turn returned to one side of the solid state switching element 14a which is at minus 150 volts with respect to the earth ground of supply 20.

When more than one drive network is used, each of the drive networks is electrically buffered from the first and other networks by the capacitor C-3 and the diode D-3 connected as shown in FIG. 1.

The rectifier and voltage doubler circuit 10 comprises an input resistor R1 connected to one side of the power source 20. Diodes D1 and D2 are both connected in parallel but in opposite polarity to the other end of resistor R1. A resistor R2 and capacitors C1 and C2 are connected across the diodes D1 and D2 and the other input terminal from the power source 20 is connected to the midpoint between capacitors C1 and C2. The output voltage is available across resistor R2 and capacitors C1 and C2. The limiting element 11 comprises preferably two 100 watt light bulbs having a resistance equivalent to resistor R3 connected to the positive output side of capacitor C1 in the rectifier circuit and in series will all of the drive networks for all of the ozonators.

Since each of these drive networks is identical only the single network driving generator 34a having high voltage electrodes 17a connected by bus 35a and ground electrodes 18a connected by bus 36a will be described in detail. The DC output from the rectifier 10 is chopped by a solid state switch element which is preferably a silicon controlled rectifier (SCR) 14a which turns on whenever a pulse is applied at the gate G and turns off when the voltage at its anode A drops to zero volts. This silicon controlled rectifier is controlled by a trigger component which may comprise the neon lamp 13a and by a timing network 12a comprising resistor R4 and capacitor C4 which are series connected with each other and with the limiter 11 across the output of rectifier 10. Neon lamp 13a is connected from the junction point of R4 and C4 to gate G of silicon controlled rectifier 14a. The trigger component could also be a diac.

As power is applied to the RC timing network 12a, the capacitor C4 charges up to the firing voltage of the neon lamp 13a (which is approximately 70 volts) through resistor R4. This fires the neon lamp which in turn applies a pulse to the gate of the silicon controlled rectifier and turns it on to its conductive state. As the current starts to flow through the limiting resistor R3, all the voltage output of the rectifier 10 is dropped across limiter 11 and the anode of SCR 14a goes down to zero voltage difference with respect to the cathode K. This permits the capacitor C4 of the RC timing network to discharge. As soon as the SCR is turned off by feedback from capacitor C6 due to its discharge, the current stops flowing through the limiter 11 and the voltage at the SCR anode and across the RC timing network goes up to again equal the 300 volt output of rectifier circuit 10. The capacitor C4 starts to charge up again and the whole cycle is repeated. The frequency of the cycle may be altered by changing the value of either resistor R4 or capacitor C4 which determine the time constant of the circuit in accordance with well known principles. The voltage between the anode A and the cathode K of the SCR 14a continuously changes from almost zero volts to approximately 300 volts at a frequency determined by the time constant of the RC timing network 12a. This alternating voltage is applied through the coupling capacitor C6 to the input of the auto-transformer T which is preferably used for element 16a. It will be noted that a snubbing and clipping network 15a is connected across switch 14a ahead of capacitor C6. Network 15a includes resistor R5 and capacitor C5 which are connected across the terminals of the solid state switch 14a as well as diode D4 which is similarly connected across the same terminals with a polarity opposite to that of the solid state switch 14a. R5 and C5 function to suppress radio frequency interference and D4 is used to eliminate negative transients. The capacitor C6 is series connected to couple the switch output to the auto-transformer input, thus avoiding the use of choke coils which have been commonly used for this purpose in the prior art.

The output transformer T is an auto-transformer of the automotive ignition coil type which builds up the voltage of the alternating output of the solid state switch 14a to a level of 30,000 to 50,000 volts peak-to-peak. This high voltage is applied across the electrodes 17a and 18a to establish a corona discharge between these electrodes. Oxygen which is passed between the electrodes is converted to ozone in accordance with the equation $3O_2 \rightarrow 2O_3$.

Figure 2:
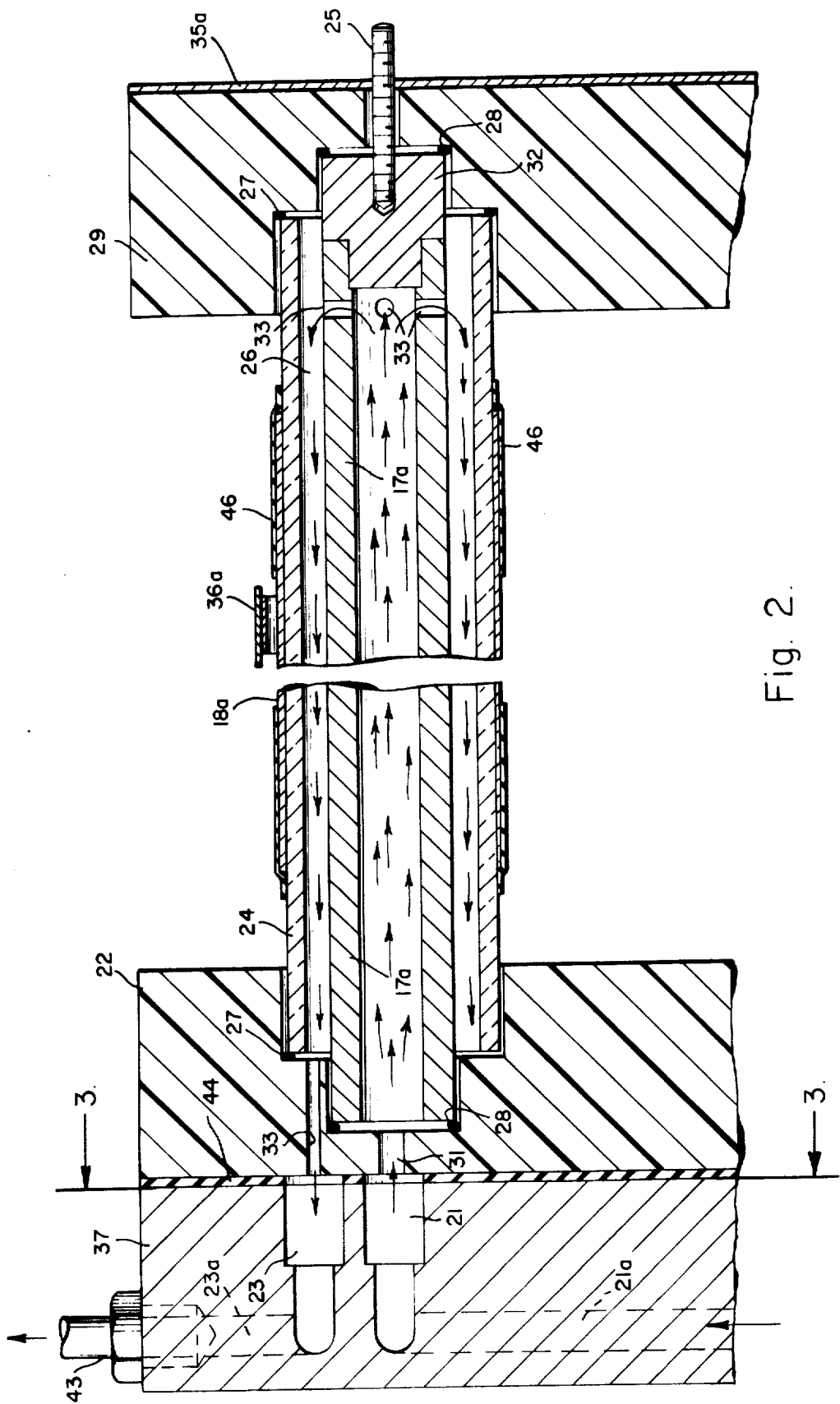
FIG. 2 is a sectional view, partially broken away, through one ozonator cell of the corona generator and manifold.
Figure 3:
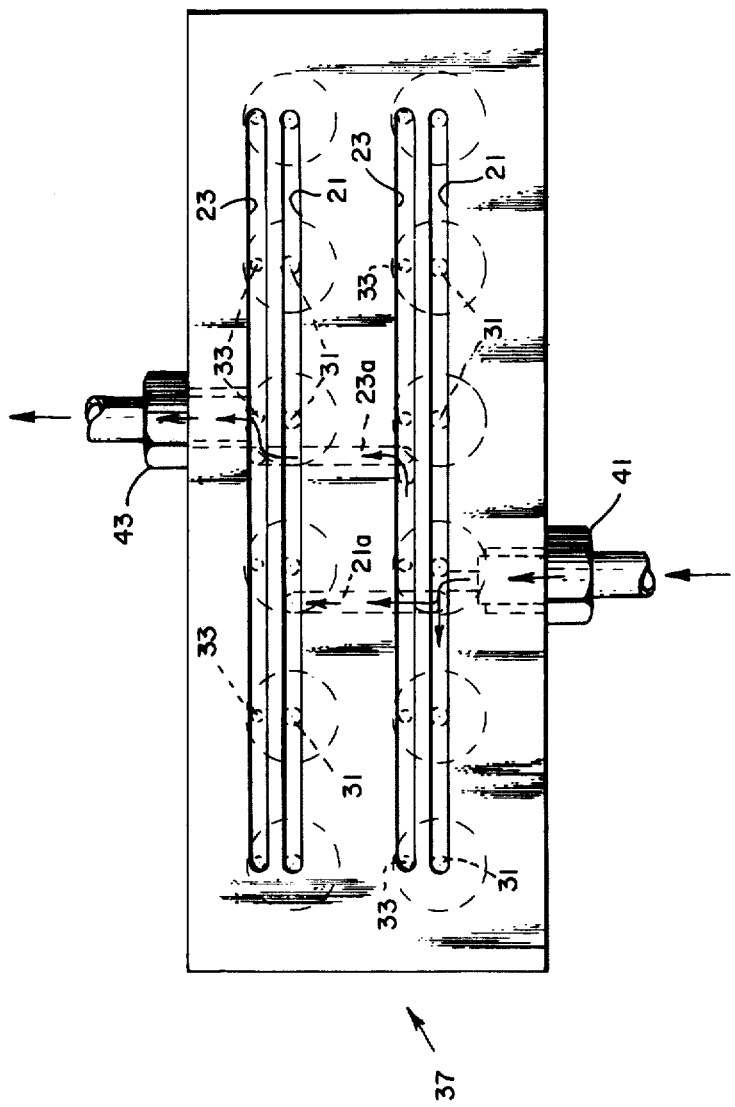
FIG. 3 is a plan view looking in the direction of the arrows 3—3 of FIG. 2 showing the air inlet and outlet channels.
Figure 4:
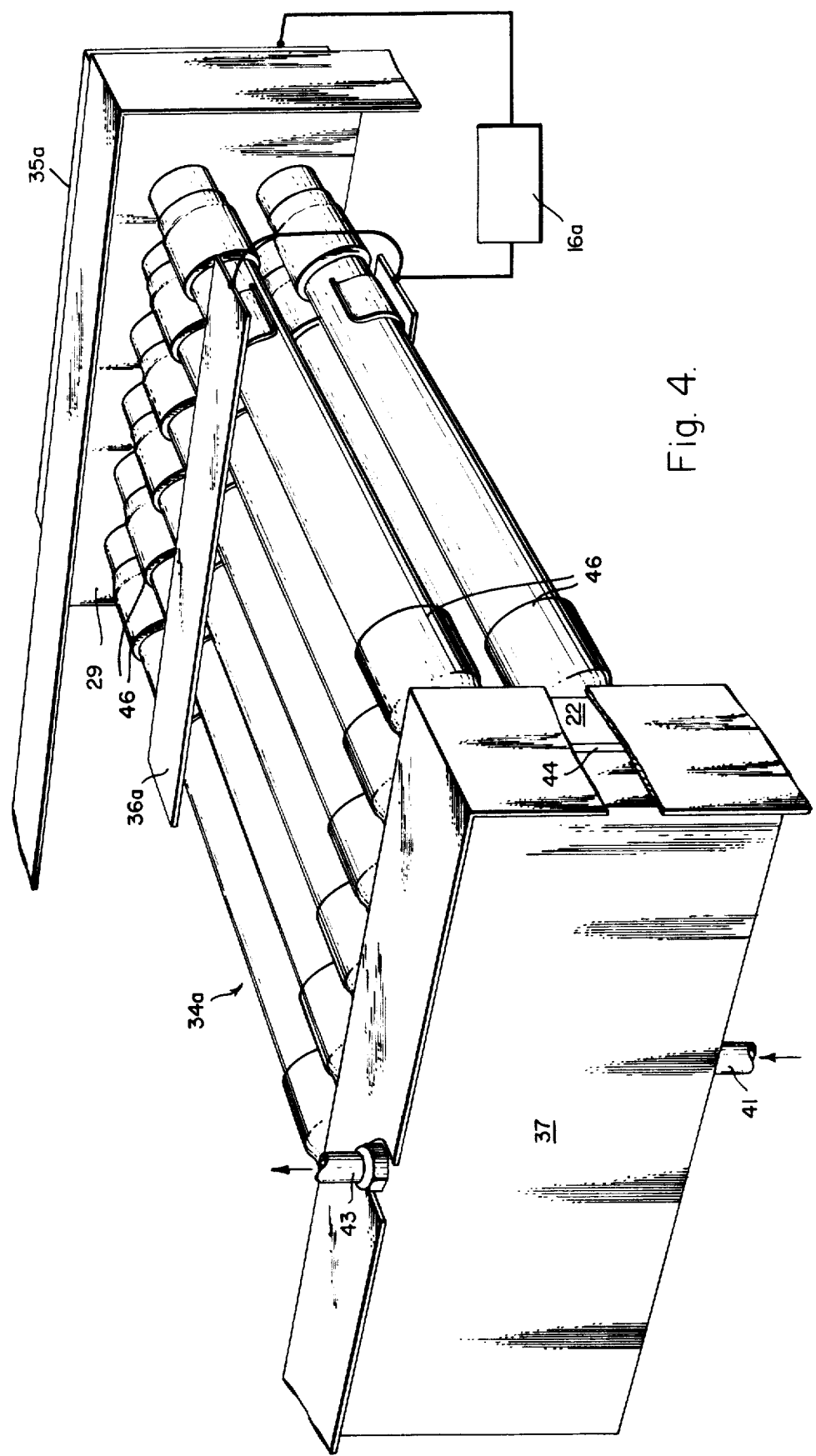
FIG. 4 is a perspective view, partially broken away, of one plural ozonator cell corona generator assembly.

A preferred exemplary from one cell of the ozonator 34a in which this reaction occurs is shown in the detailed sectional view of FIG. 2. In the perspective view of FIG. 4, there is shown plurality of such cells mounted to form an ozone generator 34a. In FIGS. 2, 3, and 4, it will be seen that air or oxygen, supplied at a dew point of −40° F minimum, flows from inlet passage 21 of a gas manifold member 37 through the electrode insulator and diverter 22 into the hollow interior of stainless steel high voltage electrode 17a. The incoming gas enters the cylindrical stainless steel electrode through an entry port 31 in the member 2 which communicates with the interior of the cylindrical electrode 17a at one end thereof. At the opposite end the stainless steel electrode is plugged with a stainless steel plug 32. The electrode 17a has four holes such as the hole 33 drilled into it at or near the end closed, by plug 32 so that the air oxygen can enter the chamber or gap 26 between the high voltage electrode 17a and a cylindrical glass dielectric 24 and the electrode insulator and diverter 22 on one end and by the electrode insulator 29 on the other end. O-rings 27 and 28 on each end insure gas tightness. An exit aperture 33 in the insulator 22 communicates with the gap 26 to permit the gas which has been exposed to the corona discharge to flow back into the outlet passage 23 of manifold member 37.

In FIG. 3, there is shown a plan view of the inlet channel 21 and outlet channels 23 in manifold member 37 illustrating the manner in which the gas flow passages of the twelve ozonator cells shown in FIG. 4 are connected in parallel between oxygen inlet fitting 41 and ozone outlet fitting 43. It will be noted that the 12 cells are physically supported between insulator 22 and 29 as described above. The central oxygen inlet port 31 of each cell communicates through mating holes in a gasket 44 with oxygen inlet channels 21 the lower one of which communicates with inlet fitting 41. The two inlet channels 21 for the upper and lower banks of six cells each are connected by a cross channel 21a which passes under the lower outlet channel 23 which is itself routed into the face of manifold 37. Upper and lower outlet channels 23 are similarly connected by a cross channel 23a which passes under the upper inlet channel 21. Outlet channels 23 are connected with each of the outlet ports 33 from each cell and with outlet fitting 43 to supply the ozone produced by the generator to a utilization device. The twelve ozonator cells are thus connected in parallel both with respect to oxygen inlet and ozone outlet and with respect to the electrical output auto-transformer 16a.

When the inlet gas passes through the hollow interior of high voltage electrode 17a it not only cools that electrode but, also, the gas is subjected to the field of the electrode thereby deionizing any ionized molecules in the gas.

When the deionized gas passes through the gap 26, it is exposed to a corona discharge which is caused by applying the high potential of 30,000 to 50,000 volts discussed above between the inner high voltage electrode and the ground electrode 18a. Part of the oxygen component of the air or oxygen feed gas is transformed into ozone in the discharge gap in accordance with the above equation. Thus, a combination of oxygen and ozone flows back into the manifold member 37 through the discharge port 33 to outlet channel 23 where it is combined with the ozone produced by the other 11 ozone tubes. The capacity of a 12 tube unit such as disclosed herein when fed with air is equal to one pound of ozone per day or larger. If the unit is fed with oxygen, the output of the ozonator is approximately 2½ times larger.

To prevent the loss of ozone production caused by heating of the inner high voltage electrode 17a, the flow of fresh air and/or oxygen called the feed gas is brought from inlet channel 21 of the manifold member 37 through entrance port 31 and down the interior of the tubular electrode 17a before it is admitted to the gap 26 through holes 33 to be exposed to the corona discharge on its return path back through the gap and out the exit port 33 onto the manifold. This flow pattern is used in order that the incoming gas may be deionized and may cool the inner electrode to reduce the heat limiting effect on ozone production. The outer or ground electrodes are cooled by a small fan mounted in the bottom of a rack or housing on which the ozone generator itself may be supported. If the operation of the device is interrupted as by an accidental short circuit of the electrodes, the oscillation of the switching circuit 14a—12a is interrupted and the device can only be restarted by first turning off the power. The circuit thus affords a fail-safe safety feature.

In the particular ozonator cell shown in FIG. 2, a small gap 26 and a thin dielectric 24 are used and the cell is designed to operate at pressures from zero to 15 psig. More particularly, the outer diameter of the dielectric 24 is 0.595 inches and its inner diameter is 0.495 inches. The outer diameter of the high voltage stainless steel electrode 17a is 0.375 inches with a wall thickness of 0.065 inches minimum which leaves a gap width of 0.11 inches. The stainless steel electrode 17a is made of number 316 alloy stainless steel and has a length of 4.25 inches of corona gap. The ground electrode 18a is made of stainless steel foil with a self adhesive backing for adhesion to dielectric 24 assisted by tape 46. The insulators 29 and 22 and the manifold housing 37 are made of teflon. A conductor plug 25 is seated in good electrical contact with the plug 32 in a recess therein and connects the high voltage electrode 17a to a high voltage bar 35a which connects all of the high voltage electrodes of the twelve cells in parallel across the input of the autotransformer 16a. Spring clamp type bar straps 36a similarly connect all ground electrodes 18a in parallel to the other end of the auto-transformer output.

The parallel connected capacitances of the ozone cells of the generator are thus connected to form a parallel tuned circuit with the output inductance of auto-transformer 16a. The optimum switching rate for switch 14 as set by timing circuit 12a is that which is equal to the resonant frequency of this parallel tuned output circuit. Furthermore, coupling capacitor C6 is preferably chosen to be series resonant with the input inductance of auto-transformer 16a at this same frequency. This output circuit parallel frequency is of course determined by the particular auto-transformer used and by the dimensions and hence the capacitance of the ozone cell gaps. The output voltage and hence the efficiency are a maximum at this resonance frequency and the ozone output in turn is proportional to the square of the voltage across the gap.

It will of course be understood that the gap dimensions and other specific details given above can be varied in accordance with application requirements as for example by using a larger outer diameter tube with the same wall thickness. Also, varying the inner electrode in size and alloy will produce comparable results. The insulators and manifold can also be made of other insulation materials. Furthermore, particular ozonators differing in design from that shown in FIGS. 2, 3, and 4 intended for other specific applications can of course be used with the power supply shown in FIG. 1 with appropriate selection of component values. In the preferred example shown in FIG. 2 and discussed above, the resonant output frequency was 350 Hz and the associated power supply had components with specific values as shown in the chart below.

Table 1

| Component Values in Figure 1 | |
|---|---|
| R1 = 4.7 ohm, 10W, fused resistor | D1 = 3 amp., 400V rectifier |
| R2 = 330 Kohm 1/2W | D2 = 3 amp., 400V rectifier |
| R3 = 2 × 600 ohm/50W or 2 × 100W lamps | D3 = 3 amp., 400V rectifier |
| R4 = 100 Kohm/100W | D4 = 1 amp., 1000V rectifier |
| R5 = 1K, 1/2W | SCR 14a = Ci22D |
| C1 = 100mfd/250V | Neon 13a = NE83 |
| C2 = 100mfd/250V | Transformer T = any automotive ignition coil (e.g., Blue Streak, UC 12 X) |
| C3 = 100mfd/250V | |
| C4 = .0068mfd/1KV | |
| C5 = .01mfd/1KV | |
| C6 = 1mfd/400V rectifier | |

While it will be understood that the foregoing circuit component values and ozonator cell dimensions and materials are exemplary only, they do illustrate the principles embodied in a preferred embodiment which has experimentally been found to give unusually efficient operating results in that it is capable of producing one pound of ozone per day when fed with air on a total power consumption of only 3.6 Kilowatt per pound of ozone produced. Fed with oxygen, the output of the ozonator is approximately 2½ times larger with the same power consumption. Correspondingly large advantages in efficiency can also be obtained with other specifically different ozonator designs utilizing the appropriate circuit design standards set forth above for the power supply component values in order to match the power transfer and power supply requirements to the capacitive load defined by the particular ozonator cell being used.

We claim:

1. Apparatus for generating high concentrations of ozone in a high voltage ozonator driven by a solid state high voltage power supply, said apparatus comprising:
  a. a corona generator comprising at least one ozonator cell including a high voltage electrode, a ground electrode spaced apart from said high voltage electrode and a layer of dielectric material between said electrodes, said layer being in contact with one of said electrodes and spaced a predetermined gap distance from the other said electrode, said cell being fabricated for a normal operating voltage range of 30,000 to 50,000 volts across said gap;
  b. means for flowing an oxygen containing gas through said gap between said spaced apart electrodes; and
  c. power supply means for establishing a potential difference in the range of 30,000 to 50,000 volts between said electrodes to establish a corona discharge therebetween to transform a portion of said oxygen into ozone, said power supply means comprising:
    i. rectifier circuit means for rectifying current from an AC power source;
    ii. solid state switching circuit means for interrupting said rectified current at a predetermined frequency;
    iii. limiting impedance means for connecting said rectifier output to said solid state switching circuit means;
    iv. timing circuit means and trigger component means for controlling the frequency of operation of said solid state switching circuit means; and
    v. an auto-transformer of the automotive ignition coil type having its input winding connected by a coupling capacitor to said solid state switching circuit means and having its output connected across said electrodes of said ozonator cell to establish said potential difference therebetween, the capacitance of said cell forming a parallel tuned circuit with the output inductance of said auto-transformer.

2. Apparatus as in claim 1 wherein said solid state switching means is operated at a frequency equal to the resonance frequency of the parallel tuned circuit formed by the capacitance of said ozonator cell electrodes and the output inductance of said auto-transformer.

3. Apparatus as in claim 2 wherein said coupling capacitor has a value such as to form with the inductance of the input winding of said auto-transformer a series tuned circuit having the same resonant frequency as that of said parallel tuned output circuit.

4. Apparatus as in claim 3 wherein said resonant frequency and the frequency at which said switching circuit means is operated are both 350 cycles per second and wherein said gap in said ozonator has a width of 1/100th of an inch.

5. Apparatus as in claim 1 wherein said corona generator comprises a plurality of ozonator cells connected in parallel across the output of said auto-transformer.

6. Apparatus as in claim 5 wherein said ozone generator comprises a plurality of said plural cell corona generators, each of said corona generators being the same as all others and each of said corona generators, having associated therewith an auto-transformer of the automotive ignition coil type, a solid state switching means, a timing circuit means, and a trigger component controlling said solid state switching means, said apparatus further comprising:
  a. a single rectifier curcuit means for rectifying current from an AC power source; and
  b. a single current limiting impedance connected in series between the output of said rectifier circuit means and parallel connected inputs to all of said solid state switching circuit means.

7. Apparatus as in claim 1 wherein said electrodes of said ozonator cell are concentric tubular electrodes and wherein said apparatus further comprises:
  a. means for communicating one end of the interior of said tubular inner electrode with said gap formed between said electrodes;

b. means for supplying oxygen to the other end of the interior of said tubular inner electrode to flow in heat exchange and electric deionizing field relationship therewith before passing through said communicating means into said gap; and c. means for exhausting ozone and oxygen from the end of said gap adjacent said other end of said inner electrode to which oxygen is supplied after said oxygen has flowed through the interior of said inner electrode and back through said corona discharge in said gap.

8. Apparatus as in claim 7 including a plurality of said ozonator cells and further including:

a. means for supplying oxygen to all of said cells in parallel gas flow; and b. means for exhausting ozone from all of said cells in parallel gas flow.

9. Apparatus for generating high concentrations of ozone in a high voltage ozonator driven by a solid state high voltage power supply, said apparatus comprising:

a. a corona generator comprising at least one ozonator cell including a high voltage electrode, a ground electrode spaced apart from said high voltage electrode, and a layer of dielectric material between said electrodes, said layer being in contact with one of said electrodes and being spaced a predetermined gap distance from the other of said electrodes;

b. means for flowing an oxygen containing gas through said gap between said spaced apart electrodes; and c. power supply means for establishing a potential difference between the electrodes of said ozonator cell to establish a corona discharge therebetween to transform a portion of said oxygen into ozone, said power supply means comprising:

i. rectifier circuit means for rectifying current from an AC power source;

ii. solid state switching circuit means for interrupting said rectified current at a predetermined frequency;

iii. limiting impedance means for connecting said rectifier output to said solid state switching circuit means;

iv. timing circuit means and trigger component means for controlling the frequency of operation of said solid state switching circuit means; and v. an auto-transformer of the automotive ignition coil type having its input winding connected by a coupling capacitor to said solid state switching circuit means and having its output winding connected across said electrodes of said ozonator cell to establish said potential difference therebetween, the capacitance of said ozonator cell forming a parallel tuned circuit with the inductance of the output winding of said auto-transformer and the capacitance of said coupling capacitor forming a series tuned circuit with the inductance of the input winding of said auto-transformer.

10. Apparatus as in claim 9 wherein said series tuned circuit and said parallel tuned circuit at the input and output windings of said auto-transformer respectively are each tuned to substantially the same resonant frequency.

* * * * *